United States Patent [19]

Kazaoka et al.

[11] 4,378,101
[45] Mar. 29, 1983

[54] STEPWISE SEAT SLIDE ADJUSTER FOR VEHICLES

[75] Inventors: Kenichi Kazaoka, Nagoya; Saburo Suzuki, Toyota, both of Japan

[73] Assignee: Aisin Seiki Kabushiki Kaisha, Aichi, Japan

[21] Appl. No.: 178,435

[22] Filed: Aug. 15, 1980

[30] Foreign Application Priority Data

Aug. 22, 1979 [JP] Japan .................................. 54-106831

[51] Int. Cl.$^3$ ........................ B60N 1/08; F16M 13/00
[52] U.S. Cl. .................................... 248/429; 248/430; 74/141.5
[58] Field of Search ....................... 248/429, 430, 420; 74/141.5, 536, 533

[56] References Cited

U.S. PATENT DOCUMENTS

| | | |
|---|---|---|
| 2,630,297 | 3/1953 | Hunz .............................. 74/141.5 X |
| 2,951,679 | 9/1960 | Volkert .......................... 74/141.5 X |
| 3,071,979 | 1/1963 | Hoose .............................. 74/141.5 |
| 3,450,425 | 6/1969 | Leonhardt ..................... 248/430 X |
| 3,460,794 | 8/1969 | Coulautti ........................... 248/430 |
| 4,109,973 | 8/1978 | Terada ........................... 248/430 X |
| 4,168,051 | 9/1979 | Terada ........................... 74/533 X |

FOREIGN PATENT DOCUMENTS 50-71021 12/1975 Japan .................................. 248/429
1079872 8/1967 United Kingdom ............... 248/429

Primary Examiner—Francis K. Zugel
Assistant Examiner—Peter A. Aschenbrenner
Attorney, Agent, or Firm—Oblon, Fisher, Spivak, McClelland & Maier

[57] ABSTRACT

A stepwise seat slide adjuster for vehicles includes a stationary lower guide rail adapted to be mounted to a vehicle floor, an upper guide rail adapted to be mounted to a vehicle seat and capable of a longitudinally sliding movement relative to the lower guide rail, a manually operated lever having a first pawl pivotally supported on the upper guide rail and releasably engaging any one of the latch teeth formed along the longitudinal edge of the lower guide rail, and a second pawl actuated in response to the release action of the manual lever which disengages the first pawl from the tooth with which it engages, so that the first pawl can backward stepwise slide to a latch tooth which corresponds to a selected seat position and engage with the tooth.

13 Claims, 4 Drawing Figures

STEPWISE SEAT SLIDE ADJUSTER FOR VEHICLES

BACKGROUND OF THE INVENTION

1. Field of the Invention

The present invention relates generally to a vehicle seat slide adjuster, and more particularly to a stepwise seat slide adjuster which permits a stepwise repositioning of the seat to any desired forward and rearward position.

2. Description of the Prior Art

Seat slide adjusters in the prior art have several disadvantages and problems in their construction and operation. For example, for selecting any forward or rearward seat position, it is usually operated to disengage the latch mechanism from its engaged position, however, this operation causes the seat unstably to be moved readily forth or back at the moment the latch portion is released. Particularly, if this operation is tried to select any seat position, the seat may tend backward to move backward quickly upon release of the latch mechanism, and may therefore be moved back farther than desired and repositioned at a different position than the desired seat position. This causes inaccurate repositioning of the seat, which can lead the driver to lose his maneuvering control particularly while he is driving his car, with resulting serious traffic accident possibilities under some running situations. The same applies to the car at rest.

SUMMARY OF THE INVENTION

In order to eliminate the above-mentioned problems and disadvantages of the prior art seat slide adjuster, it is therefore a principal object of the present invention to provide an improved seat slide adjusting assembly which has a simple construction and permits a stepwise, preferably step by step seat repositioning with accuracy and reliability or security.

DESCRIPTION OF THE DRAWINGS

Those and other objects and features of the present invention will become more clearly understood from the description which follows by reference to the accompanying drawings, in which.

DETAILED DESCRIPTION OF THE PREFERRED EMBODIMENTS

Figure 1:
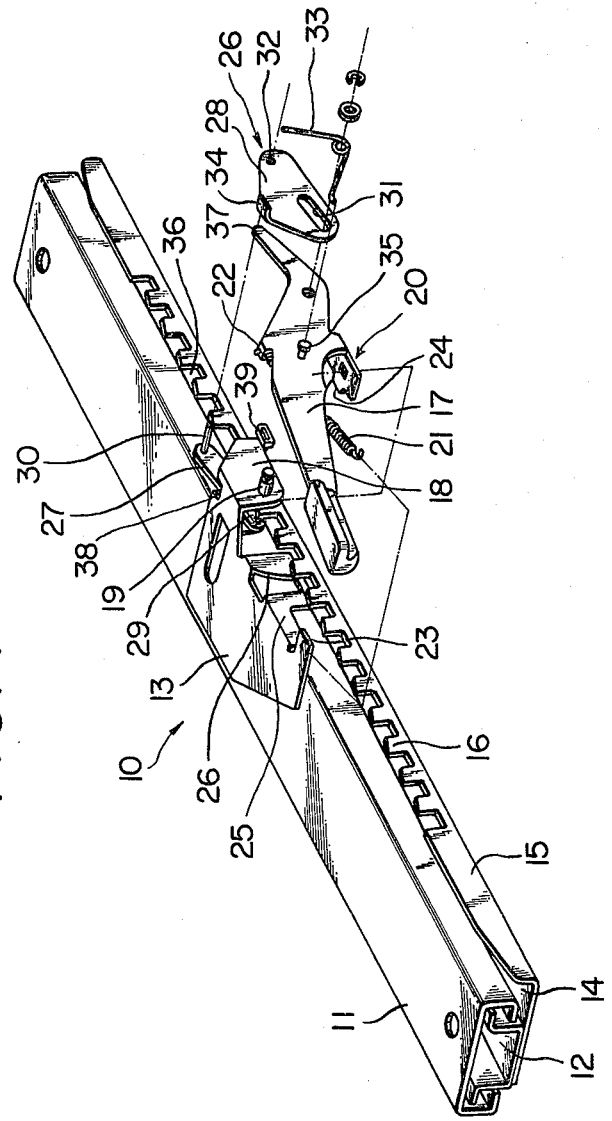
FIG. 1 is an exploded view illustrating the stepwise seat slide adjuster arrangement in one embodied form of the present invention.

Referring now to the drawings, one preferred embodiment of the present invention shown therein is described in further detail. It should be understood that the embodiment and drawings are disclosed by way of example for the sole purpose of the illustration of the invention, and therefore the invention is not limited to the shown and described embodiment and drawings and various changes and modifications may be made within the spirit and scope of the invention.

A seat slide adjuster arrangement generally designated by 10 includes a movable upper guide rail 11 and a stationary lower guide rail 12. The upper guide rail 11 is adapted to be rigidly mounted to a vehicle seat portion (not shown) which is adjustably slidable in the forward or rearward direction with respect to the fixed lower guide rail 12. The lower guide rail 12 is mounted to a vehicle floor (not shown). When the two guide rails are assembled, the upper guide rail 11 surrounds the lower guide rail 12, and is adapted for a longitudinally slidable movement relative to the lower guide rail 12 as described above. A bracket 13 for a manually operated lever member later to be described in detail is rigidly secured to the upper guide rail 11 on the upper central face thereof. The lower guide rail 12 has a latch plate 14 rigidly secured to the underside thereof, the latch plate 14 including a flanged portion 15 extending upwardly on one side thereof and having a plurality of regularly spaced latch teeth 16 aligned in the longitudinal direction of the latch plate 14. A manually operable lever member 17 is pivotally supported on a pivotal pin 19 fixed on a flanged portion 18 extending downwardly from the bracket 13. The lever member 17 has a first pawl means 20 integrally formed at the lower end thereof and which is adapted to engage any one of the latch teeth 16 of the latch plate 14. One end loop of a spring 21 is retained by a portion 22 of the lever member 17 and the other end loop is held by a portion 23 of the lever bracket 13. Thus, the spring 21 normally provides the biasing force which always urges the lever member 17 toward turning counterclockwise on the pivotal pin 19 as viewed in FIG. 2, so that the first pawl means 20 of the lever member 17 can normally be brought in engagement with any one of the teeth 16 of the latch plate 14. The bracket 13 has a flanged portion 25 which is bent downwardly on one side of the upper guide rail 11, the flanged portion 25 having a guide channel or groove in which a projection 24 on the first pawl means of the lever member 17 travels when the lever 17 is operated for rotation.

A second pawl means generally designated by 26 consists essentially of an arm member 27 and a bracket 28. The arm member 27 has an elongated hole 29 at one end thereof, through which the pivotal pin 19 is inserted for supporting the arm member 27 so that it can be slidable laterally with respect to the pivotal pin 19. The arm member 27 has a pin 30 fixed at the other end thereof, and the bracket 28 has an elongated hole 31 in a position corresponding to the elongated hole 29 in the arm member 27. The pin 19 passes through the elongated hole 31 for supporting the bracket 28 to permit the bracket 28 to move slidably with respect to the pin 19. As clearly seen in FIG. 1, the pin 30 on the arm member 27 extends through a hole 32 formed at the other end of the bracket 28, and thus the arm member 27 and bracket 28 cooperate with each other to work together by means of the pin 30. A spring 33 has one end thereof retained by a portion 34 of the bracket 28, and the other end is retained by a pin 35 provided substantially centrally of the lever member 17. As such, the spring 33 normally provides its biasing force which always urges the bracket 28 toward turning clockwise on the pivotal pin 19 as viewed in FIG. 2, thus forcing the pin 30 on the arm member to engage with any one of the recesses 36 between the adjacent latch teeth 16 of the latch plate 15. The lever member 17 includes an extension 37 extending on one side thereof, the extension 37 resting against the pin 30 of the arm member 27 so that the pin 30 is prevented from engaging with any one of the recesses 36 of the latch plate 15 when the first pawl means engages any one of the latch teeth 16 of the latch plate 14 as viewed in FIG. 2.

The lever bracket 13 has a cutout 38 which serves as a guide to allow the arm member 27 for pivotal rotation. Reference numeral 39 designates a stop of any resilient material rigidly secured to the flanged portion 18 of the bracket 13, the stop 39 abutting against the bracket 28 so that it is prevented from further rotation in the clockwise direction as viewed in FIG. 3. The stop 39 also absorbs any noises that may be caused upon impact of the rotating bracket 28.

Figure 2:
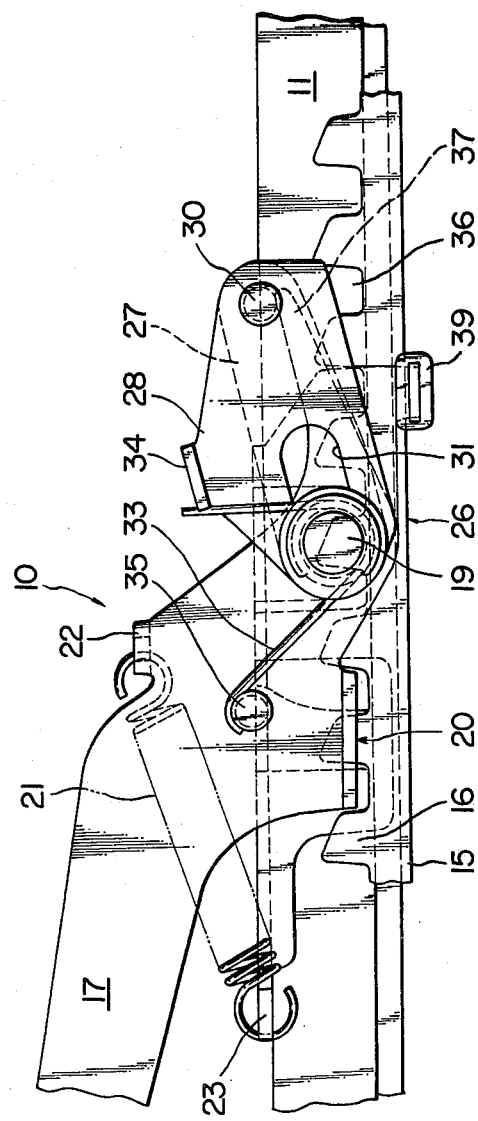
FIG. 2 illustrates the parts of the adjuster in their initial engaging stage.

To aid in making the structure of the above described embodiment better understood, its operation is now described. In operation, when it is desired to reposition the seat (not shown) by moving it in the forward direction, the manually operated lever member 17, which is now placed in the position as viewed in FIG. 2, is then rotated on its pivotal pin 19 in the clockwise direction, overcoming the biasing force of the spring 21. The clockwise rotation of the lever member 17 causes the first pawl means 20 of the lever 17 now engaging with a latch tooth 17 to be released from that tooth, as viewed in FIG. 3. Such rotation of the lever 17 also causes its extension 37 to be rotated clockwise therewith and thus to be moved out of engagement with the pin 30 of the arm member 27. The bracket 28 is thus urged by the biasing force of the spring 33 to turn on the pivotal pin 19 in the clockwise direction together with the arm member 27. Accordingly, the arm member 27 rotating clockwise on the pin 19 moves its pin 30 therewith down to a position just above a recess 36 of the latch plate 15. Then, when the seat (not shown) is moved to a forward position, the pin 30 of the arm member 27 can readily be moved over a tooth or teeth 16 of the latch plate 15 until the seat reaches the above selected forward position. With the seat thus repositioned, permitting the lever member 17 to turn counterclockwise causes its first pawl means 20 to engage with the tooth which corresponds to the selected seat position and be locked therein. During the above operation, the extension 37 of the lever member 17 is moving into engagement with the pin 30 of the arm member 27, causing the second pawl means 26 (including the arm member 27 and bracket 28) to be moved back to the position as shown in FIG. 2.

Figure 3:
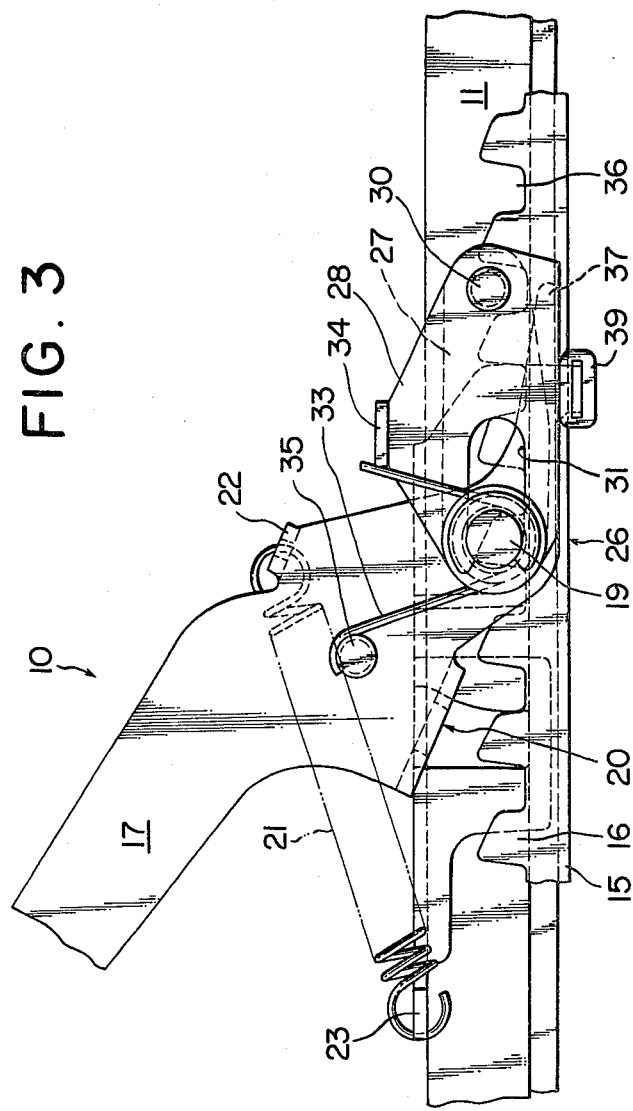
FIG. 3 illustrates those parts in their released or disengaged condition.
Figure 4:
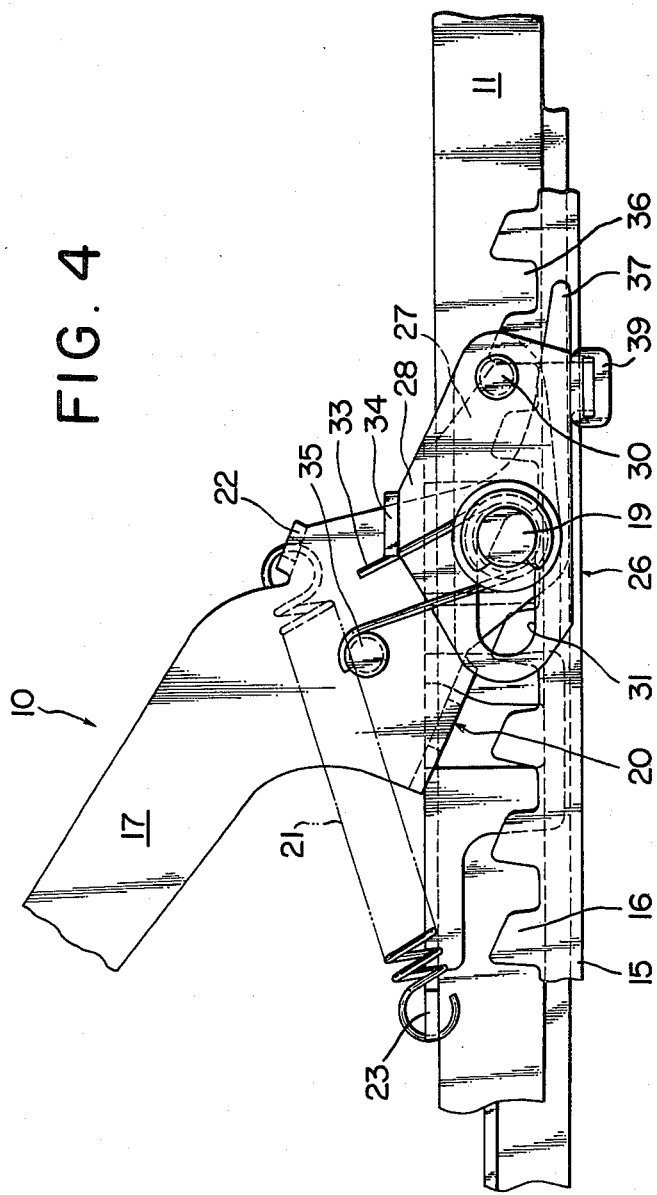
FIG. 4 illustrates the parts reengaged after one step backward movement placing the seat at a newly selected position.

When it is desired to move the seat backward in a stepwise manner or one tooth after another to be repositioned at a selected position, moving the seat from the position as viewed in FIG. 3 backward by a first step position causes the lever member 17 with its pivotal pin 19 to slide backward over the entire length of the elongated holes 29 and 31 of the second pawl means 26. Thereafter, operating the lever member 17 to turn on the pin 19 counterclockwise causes the first pawl 20 of the lever member 17 to engage with the one of the teeth 16 of the latch plate 15 which corresponds to the first step seat position. The same operation is repeated stepwise until finally the selected seat position is reached.

In the above described embodiment, the second pawl means 26 which is additionally provided over the prior art latch mechanism is operated in response to the release action of the manually operable lever member which disengages the first pawl means from one latch tooth, so that the second pawl means can act upon the first pawl means to engage with another subsequent tooth, such operation being repeated one tooth after another until the selected seat position is finally reached. As noted above, the seat repositioning operation according to the present invention is particularly advantageous over the prior art operation, since it is performed in the stepwise manner, preferably one step after another, without causing a skip, directly to the selected backward seat position. Therefore, the correct seat repositioning can be achieved even when the car is running at speeds, without causing a sudden seat backward movement that may adversely affect the driver's maneuvering control. As readily understood from the above described embodiment, repositioning of the seat takes place one tooth after another in either forward or backward direction. In an alternative form of the earlier embodiment, the upper guide rail attached to the seat may be made to slide by two or more teeth to place the seat to its selected position, by determining the length of the elongated hole 31 as appropriate. The pitch between the adjacent latch teeth may also be varied according to the specific needs, so that the stepwise seat slide movement can take place depending upon the selected pitch.

In the earlier embodiment, the common pivotal pin 19 supports both the first and second pawl means, and is preferred since it reduces the number of the parts required, permits easier installation in a vehicle, and provides safety and reliable operations. Alternatively, another pivotal pin may be provided on the first pawl means for supporting the second pawl means.

The pin 30 on the second pawl means 26 which releasably engages a recess between the adjacent latch teeth may be of any other suitable shape if it can properly engage the recess, and can also easily pass over the latch tooth or teeth when it is moved in the forward direction. The pin 30 may be equipped with a sleeve as required. The bracket 28 may be eliminated from the second pawl means in some cases without affecting the functional effect of the second pawl means itself. However, it is preferably required since it can serve as a guide to ensure that the pin 30 can engage with the recess with accuracy.

Although the present invention has been described by reference to the several preferred embodiments thereof, it should be understood that various changes and modifications may be made without departing from the spirit and scope of the invention.

What is claimed as new and desired to be secured by Letters Paten of the United States is:

1. A seat slide adjuster for vehicles including a stationary lower guide rail mountable to a vehicle floor, a movable upper guide rail mountable to a vehicle seat and capable of a longitudinally sliding movement relative to the lower guide rail, and a manually operated lever member pivotally supported on the upper guide rail and having first pawl means releasably engaging any one of a plurality of regularly spaced latch teeth integrally formed along the lower guide rail at a predetermined pitch, and second pawl means mounted on said lever for pivotal movement and for longitudinal movement by a predetermined multiple of said pitch, said second pawl means being biased into engagement with said teeth and releasable from said engaged condition by said lever when said first pawl means is engaged with said teeth.

2. A stepwise seat slide adjuster as defined in claim 1, wherein supporting the second pawl means on the manually operated lever is done slidably with respect to the lever by means of a pin through an elongated hole.

3. A stepwise seat slide adjuster as defined in claim 1, wherein said second pawl means has an arm member provided with an elongated hole and a pin releasably engaging with a recess, and said manually operated lever has a pivotal pin fixed to the upper guide rail, whereby said second pawl means is supported on said lever pivotally and slidably by means of said pivotal pin through said elongated hole.

4. A stepwise seat slide adjuster as defined in any one of claims 2 to 3, wherein a spring is provided for biasing the second pawl means toward turning on the pivotal pin in the same direction as the manually operated lever when said second pawl means is actuated in response to the release action of the lever.

5. A stepwise seat slide adjuster as defined in claim 2 or 3, wherein said elongated hole has a longitudinal length which allows the manually operated lever and the second pawl means to slide relatively to each other by one or a plurality of pitches of the latch teeth on the lower guide rail.

6. A stepwise seat slide adjuster as defined in claim 2, wherein said second pawl means is released from a latch recess with which it engages, when the first pawl means on the manually operated lever is operated to engage with a latch tooth on the lower guide rail.

7. A stepwise seat slide adjuster as defined in claim 3, wherein the manually operated lever includes an extended part at one end releasably abutting against the latch engaging pin of the second pawl means, whereby said latch engaging pin is actuated to engage with said extended part and also disengage from the latch recess, when the first pawl means of the lever is operated to engage with the lower guide rail latch tooth.

8. A stepwise seat slide adjuster as defined in claim 1, wherein said second pawl means can move forward slidably over the latch teeth when the first pawl means is disengaged from the latch tooth.

9. A stepwise seat slide adjuster as defined in claim 8, wherein the latch teeth are provided with backward slanted tops so that the latch engaging pin of the second pawl means positioned at an upper portion in the latch recess is forward slidable over the latch teeth when said second pawl means is engaging with any one of the latch recesses.

10. A stepwise seat slide adjuster as defined in claim 1 or 4, wherein said manually operated lever is loaded with a spring which provides its biasing force to urge said lever toward engaging with the latch tooth.

11. A stepwise seat slide adjuster as defined in claim 10, wherein said manually operated lever is loaded with a spring which provides its biasing force to urge said lever toward turning counterclockwise on the pivotal pin.

12. A stepwise seat slide adjuster as defined in claim 9, wherein the upper guide rail has a stop which abutts against the second pawl means and prevents it from further clockwise turning.

13. A stepwise seat slide adjuster as defined in claim 12, wherein said step is made of a resilient material.

* * * * *